(12) United States Patent
Cardwell (10) Patent No.: US 11,796,105 B2
(45) Date of Patent: Oct. 24, 2023

(54) CONNECTOR ASSEMBLY FOR COUPLING A VESSEL TO A FLUID TUBE

(71) Applicant: Cooper-Standard Automotive, Inc., Northville, MI (US)

(72) Inventor: Brian J. Cardwell, Ypsilanti, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/542,846

(22) Filed: Dec. 6, 2021

(65) Prior Publication Data

US 2023/0175623 A1 Jun. 8, 2023

(51) Int. Cl.
*F16L 37/252* (2006.01)

(52) U.S. Cl.
CPC .................. *F16L 37/252* (2013.01)

(58) Field of Classification Search
CPC . F16L 37/252; F16L 5/027; F16L 5/10; F16L 5/02
USPC .................. 285/139.2, 139.3, 141.1, 376
See application file for complete search history.

(56) References Cited

U.S. PATENT DOCUMENTS

| | | | | |
|---|---|---|---|---|
| 1,369,687 A | * | 2/1921 | Martin | F16N 21/04 285/332.1 |
| 3,232,644 A | * | 2/1966 | Pfeifer | F16L 37/008 285/361 |
| 3,650,551 A | * | 3/1972 | Akers | F16L 37/252 285/200 |
| 4,640,534 A | * | 2/1987 | Hoskins | F16L 37/0885 285/305 |
| 5,622,392 A | * | 4/1997 | Gochenouer | F16L 5/00 285/330 |
| 6,371,528 B1 | * | 4/2002 | Kimura | F16L 37/0885 285/305 |
| 8,851,526 B2 | * | 10/2014 | Taylor | F16L 37/0885 285/305 |
| 10,710,110 B2 | * | 7/2020 | Korus | F16L 41/14 |
| 10,711,922 B2 | * | 7/2020 | Bauer | F16L 37/252 |
| 2001/0002754 A1 | * | 6/2001 | Dobler | F16L 37/0885 285/321 |
| 2019/0032832 A1 | * | 1/2019 | Tiberghien | F16L 37/252 |
| 2020/0391599 A1 | * | 12/2020 | Mehr | F16L 5/10 |

(Continued)

*Primary Examiner* — David Bochna
(74) *Attorney, Agent, or Firm* — Paschall & Associates, LLC; James C. Paschall (57) ABSTRACT

An assembly, connector and method is disclosed for making a fluid connection between a vessel wall and a fluid tube. The assembly includes a male connector having a cylindrical body and an internal fluid passage through the male connector between a head portion located at an upper end of the male connector and a base portion on a lower end of the male connector. An aperture is formed on the vessel wall and at least first and second recesses are formed along an edge of the aperture. The base portion has at least first and second locking members located in a spaced relation to the other on opposite sides of the base portion and a sealing flange extends circumferentially about the base portion. The base portion is arranged to be installed in the aperture with each locking member accepted within a respective recess. Rotation of the male connector causes the locking members to rotate within the aperture and seal the sealing flange against the wall. A female connector connected to the fluid tube is installed on the male connector head portion.

15 Claims, 5 Drawing Sheets

(56) References Cited

U.S. PATENT DOCUMENTS

| | | |
|---|---|---|
| 2021/0190247 A1 | 6/2021 | Andersson |
| 2022/0003510 A1* | 1/2022 | Ryman .................... F16L 5/027 |

* cited by examiner

CONNECTOR ASSEMBLY FOR COUPLING A VESSEL TO A FLUID TUBE

TECHNICAL FIELD

This disclosure is generally directed to a connector assembly. More specifically, this disclosure is directed to a fluid-conducting connector for coupling a vessel to a fluid tube.

BACKGROUND

It is often desirable to affix a molded plastic fluid-conducting connector assembly to a substrate of a dissimilar material, such as the metal wall of a fluid vessel or tank to provide a cost effective attachment to a fluid tube or a fluid line. It is often not practicable to form a fluid-conducting connector from a metal similar to the vessel due to the complex geometries found on standard fluid-conducting connector assemblies such for example quick-connectors. Quick-connectors are typically used to make fluid connections according to SAE and VDA standards in vehicle engine cooling circuits and for cooling batteries of electric or hybrid vehicles. Quick connectors are often used in such applications where it is necessary to make severable connections between fluid tubes with some regularity. In cases where a molded plastic fluid-connector is required to be attached to a dissimilar substrate, such as to the metal wall of a radiator or a heat exchanger, a mechanical or an adhesive joint is usually required to be used to attach the quick-connector to the wall. While purely mechanical joints are very robust, they require additional parts for sealing. If purely adhesive sealing is used, often the mechanical strength is not as robust, and the surface cleanliness and preparation becomes very critical. It would be desirable to provide a molded plastic quick-connector assembly that can use a mechanical joint to connect the quick-connector to the metal wall or surface of a fluid vessel that provides strength and mechanical robustness and a leak resistant seal.

SUMMARY

This disclosure is directed to a fluid-conducting connector for coupling a vessel to a fluid tube.

In a first embodiment, a fluid coupling for connecting a vessel to a fluid tube is disclosed comprising a cylindrical body having a cylindrical outer surface and defining a longitudinal axis. The body includes a head portion located at an upper end of the body. The head portion forming an endform that is arranged to be received within a receptacle that is connected to the fluid tube. A base portion defines a lower end of the body and a passage extends internally through the body for the passage of fluid therethrough. The vessel includes a vessel wall and an aperture extending through the vessel wall. At least first and second locking members extend radially from the base portion of the body. The locking members are located in a spaced relation to each other on opposite sides of the body. The base portion is arranged to be installed in the aperture and each locking member accepted within a respective recess formed on an edge of the aperture. A sealing flange extends circumferentially about the base portion above the first and second locking members. Rotation of the body within the aperture produces a force in a longitudinal axial direction between the first and second locking members and the vessel wall causing the sealing flange to seal against the vessel wall.

In a second embodiment a connector assembly for making a fluid connection between a wall and a fluid tube is disclosed. The connector assembly includes a male connector having a cylindrical body and head portion located at an upper end of the male connector and a base portion defining a lower end of the male connector. An internal passage extends through the male connector for the passage of fluid. An aperture is formed on the wall and at least first and second recesses are formed along an edge of the aperture. The male connector has at least first and second locking members located on the base portion of the male connector located in a spaced relation to the other on opposite sides of the male connector. The base portion is installed in the aperture and each locking member is installed within a respective recess. A sealing flange extends circumferentially about the base portion of the male connector. Rotation of the male connector causes the locking members to rotate within the aperture and seal the sealing flange against the wall. A female connector connected to a fluid tube is installed on the male connector head portion.

In a third embodiment, A method for connecting a fluid connector between a wall and a fluid tube is disclosed. The method comprising forming an aperture on the wall, the aperture including at least first and second recesses formed along an edge of the aperture. The method further provides a male connector having a passage for fluid through the male connector between a head portion located at an upper end of the male connector and a base portion on a lower end of the male connector. The base portion further including a sealing flange extending circumferentially about the base portion and at least first and second locking members extending outward from the base portion below the sealing flange. The method additionally comprising installing the base portion in the aperture and the first and second locking members within respective first and second recesses and rotating the male connector within the aperture causing the sealing flange to seal against the wall and installing a female connector connected to the fluid tube on the male connector head portion.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
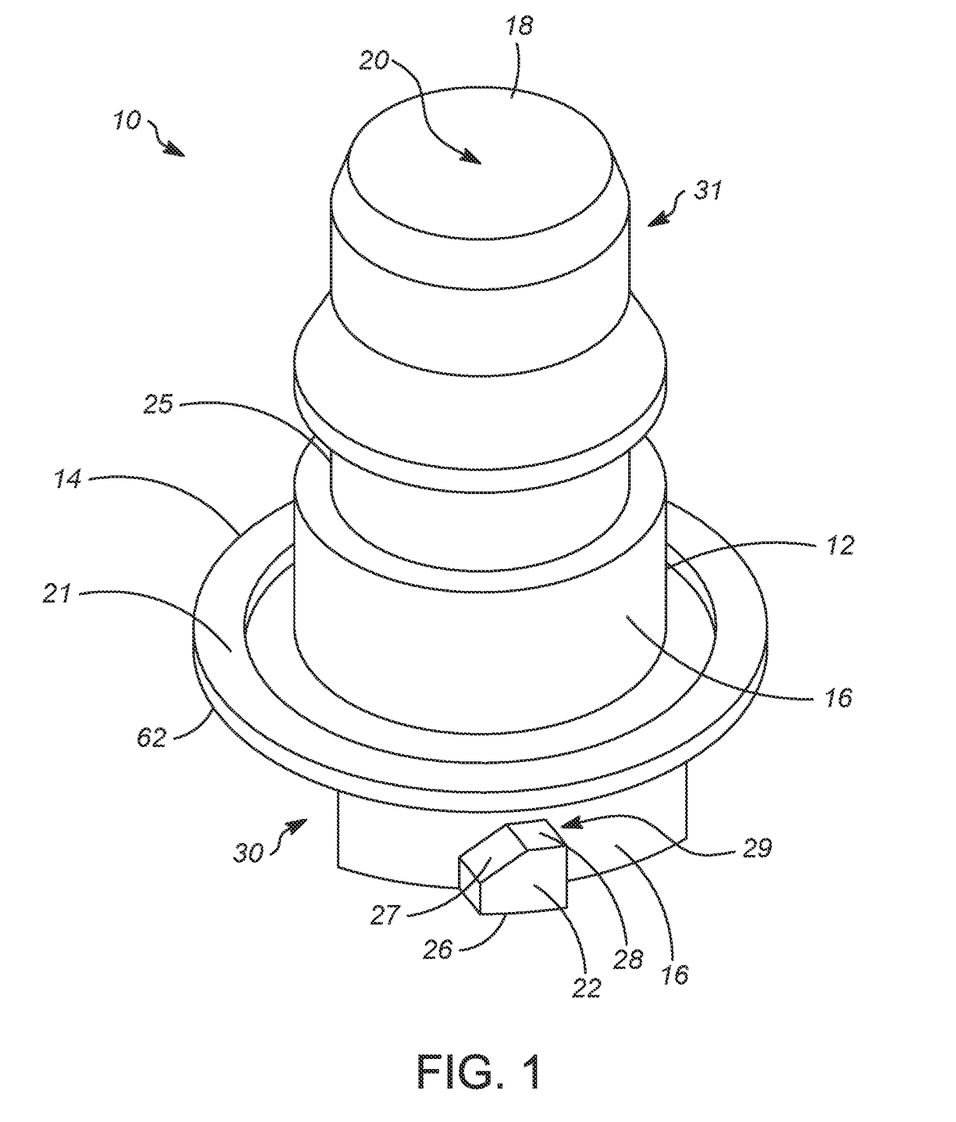
FIG. 1 illustrates a perspective view of an example male connector body according to this disclosure.
Figure 5:
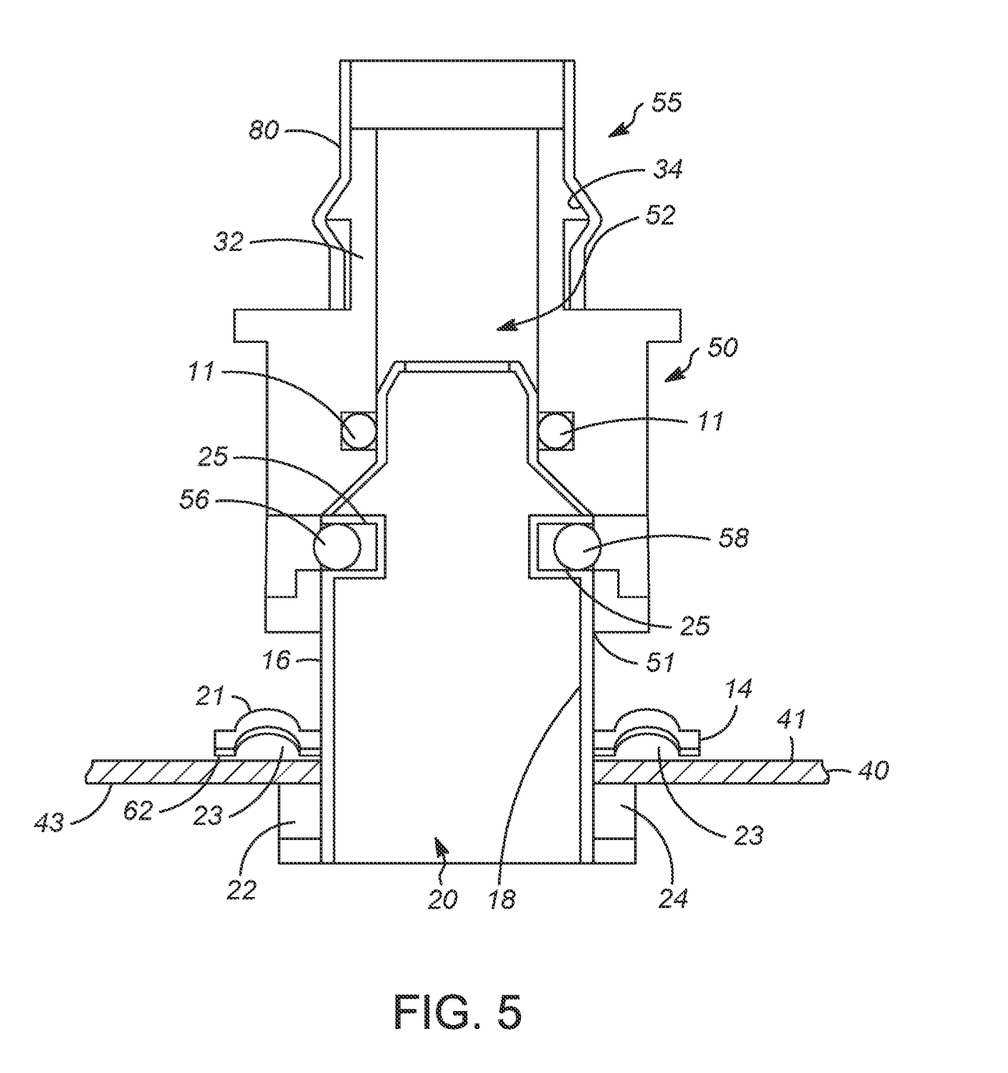
FIG. 5 illustrates a sectional view of the connector assembly having the male connector body locked on the vessel wall and a receptacle connected to the male connector body and to a fluid tube according to this disclosure.

Referring to FIGS. 1 and 5, the fluid connector of the present disclosure includes a male connector 10 comprised of a cylindrical body 12 for mounting the male connector 10 to a wall 40 of a vessel and for supporting a sealing flange 14. The body 12 is defined by a cylindrical outer surface 16 and a cylindrical inner surface 18 wherein the cylindrical inner surface 18 defines a cylindrical passage 20 through the body 12. A frustoconical head portion 31 is formed integrally with and extends radially outwardly from the cylindrical body 12 defining an endform adapted to be received within and make a fluid coupling with a receptacle 50. The head portion 31 further includes a groove 25 arranged to receive the wire legs 56, 58 of a locking clip retained on receptacle portion on the body 12. A base portion 30 defines a lower end of the body 12.

Figure 3:
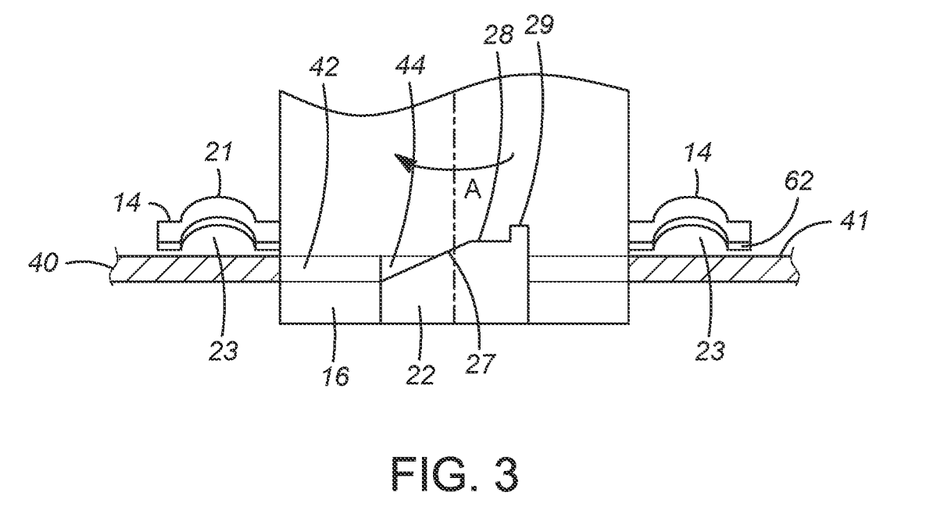
FIG. 3 illustrates a side sectional view of one of the locking members installed in the aperture recess according to this disclosure.
Figure 4:
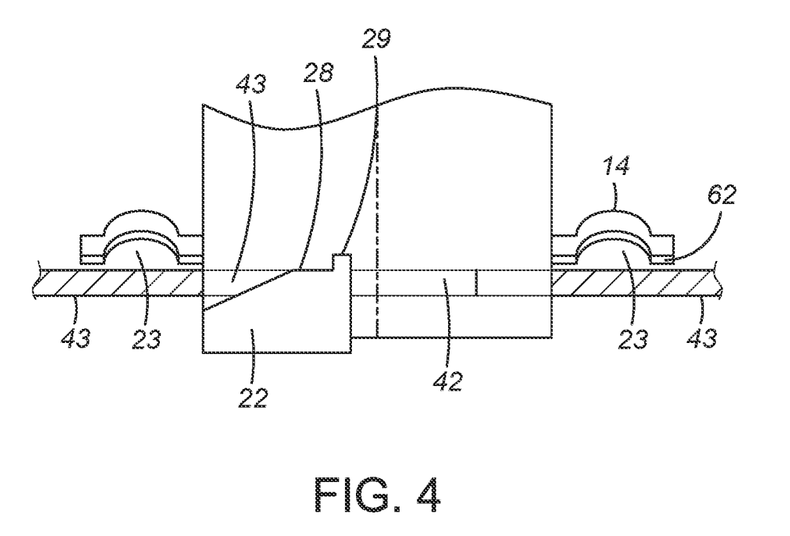
FIG. 4 illustrates a side sectional view of the locking member illustrated in FIG. 4 rotated to lock the male connector to the vessel wall according to this disclosure.

The base portion 30 includes a pair of locking members 22, 24 located on diametrically opposite sides of the cylindrical body 12. Each locking member 22, 24 includes a base 26 extending radially from the outer surface 16 of the cylindrical body 12 and a ramped surface 27 downwardly slopping away from a plateau surface 28. Each locking member 22, 24 further include a stop wall 29 extending upward from the plateau surface 27 at an end opposite the ramped surface 27. The sealing flange 14 extends circumferentially outward of surface 16 from the base portion 30 spaced above locking members 22, 24. The sealing flange 14 includes an upper surface 21 molded from the material of the body 12 and a lower surface 62 covered in a resilient compressible elastomeric material. An annular channel 23 is formed centrally to and circumferentially about the sealing member 14 as can be seen in FIGS. 3-5. The channel 23 is arranged to receive an adhesive sealant therein at the time the cylindrical body 12 is installed on the wall 40. The body 12, locking members 22, 24 and sealing flange are constructed as a unitary structure from a suitable thermoplastic material.

Figure 2:
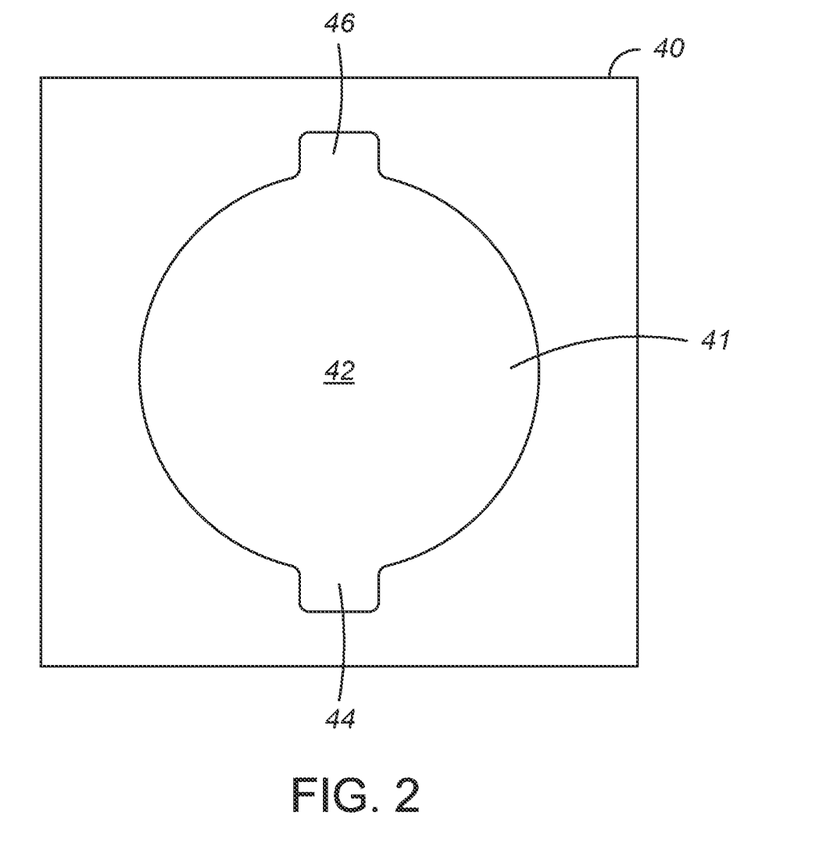
FIG. 2 illustrates a top plan view of a vessel wall configured to use the male connector body of FIG. 1 according to this disclosure.

Referring to FIGS. 2, a section of a wall 40 of a vessel containing a fluid, such as for example an engine radiator, a heat exchanger, oil cooler, etc. is illustrated. The vessel is typically constructed from a suitable steel, aluminum, or other suitable metal material. An aperture 42 is formed in the wall 40 that has a diameter closely matching the diameter of the outer surface 16 of the body 12. First and second recesses 44, 46 are defined on diametrically opposite sides of the aperture 42 and are formed with a length in a circumferential direction, which corresponds to the circumferential length of locking members 22, 24. It should be noted that the wall 40 is generally formed as a circular flattened area to define a generally flat annulus having a planar top surface 41 and a planar bottom surface 43.

The body 12 is installed onto wall 40 by inserting the base portion 30 into aperture 42 with a respective locking members 22, 24 passing through a respective recess 44, 46, as is shown for locking member 22 and recess 44 in FIG. 3.

Rotation of the body in a clockwise direction shown by arrow A, will cause the ramped surface 27 of locking member 22 to travel radially along the peripheral edge of the aperture 42, drawing body 12 downwardly. The downward movement of body 12 draws the sealing flange 14 toward the top surface 41 of wall 40. Further, rotation of the body will cause plateau surface 27 to rest on bottom surface 43 of the wall 40.

As is shown in FIG. 4, end wall 34 engages an edge of the recess 44, stopping over-rotation of the body 12. It should be noted that at the terminus of the clockwise rotation of the body 12, the maximum sealing force is applied to the sealing flange 14. The elastomeric material applied to the lower surface 62 of sealing flange 14 compresses against wall 40 top surface 41 providing a fluid tight seal between the wall top surface 41 and the body 12. Additionally, the frictional force imparted by the elastomeric material to surface 41 provides a predetermined frictional engagement between the body 12 and the wall 40 which requires a predetermined torque force to remove the body 12 through a counterclockwise direction, further securing the installation of the body 12 to the vessel wall 40.

To provide a more robust sealing joint between the sealing flange 14 and wall 40 in applications of high heat, vibration, or chemical contaminants, an adhesive sealant such as a high temperature or automotive grade silicon can be introduced into channel 23 of the flange member 14 before the body 12 is assembled onto wall 40. Compression of the sealing flange 14 onto wall 40, would also cause the adhesive sealant to seal the body 12 against surface 41 of wall 40.

The body 12 is severable from the wall 40, to allow for repair or maintenance of the vessel or the body 12. Removal of the body 12 can be made by the application of the required predetermined force in a counterclockwise direction to the body 12. As the locking members 22, 24 travel along the periphery of aperture 42 toward its associated recess 44, 46 the sealing force applied to the sealing member 14 is relieved. Aligning the locking members 22, 24 within recesses 44, 46 allows removal of locking members 22, 24 and body 12 from aperture 42.

Turning now to FIG. 5, a sectional view of a quick-connector assembly illustrates the male connector 10 locked on the vessel wall 40 and a receptacle 50 installed on male connector 10. The receptacle 50 is arranged to make a fluid coupling with body 12. The endform formed by the head portion 31 of the is arranged to be inserted into a cylindrical interior passage 52 of the receptacle 50. The endform is installed into passage 52 through an opening 51 located on a bottom portion of the receptacle 50. An elastomeric seal such as an O-ring 11 is installed on the interior surface of passage 52 that squeezes around the endform preventing leakage of fluid passing therethrough.

The receptacle 50 includes a coupling end 55 for making a fluid connection to a fluid tube 80. The coupling end 55 may include a hollow male stem 32 having a second interior passage 35. The male stem 32 may include one or more barbed flanges 34 that can be friction fitted into fluid tube 80, for example, to couple the receptacle 50 to the fluid tube 80. The receptacle 50 further includes a locking clip, composed of first and second wire legs 56, 58 that are arranged to be manually moved out of a locking position to allow the endform to be easily installed into passage 52. Once the endform is installed in passage 52, the locking clip and first and second wire legs 56, 58 are manually moved into a locking position where they engage and are retained within groove 25, locking the receptacle 50 to the endform. The receptacle 50 can be quickly disconnected from the male connector 10 by manually moving the locking clip and first and second wire legs 56, 58 from groove 25 and pulling the receptacle 50 upward from the endform.

The coupling end 55 may extend at any convenient angle applicable to the intended use of receptacle 50, which means that the coupling end 55 can have a longitudinal axis that may extend from the axis of the receptacle 50, horizontally, at a 90 degree angle from the axis, or obliquely defining an angle between coupling end 55 and receptacle 50 that is not equal to 180 degrees.

As can be seen in FIG. 5 a fluid connection is established between the male connector 10 installed on the wall 40 and the fluid contents of the vessel 40. Fluid from the vessel can flow into the passage 20 of the male connector 10 into passage 52 of receptacle 50 to tube 80, or vice versa.

Figure 6:
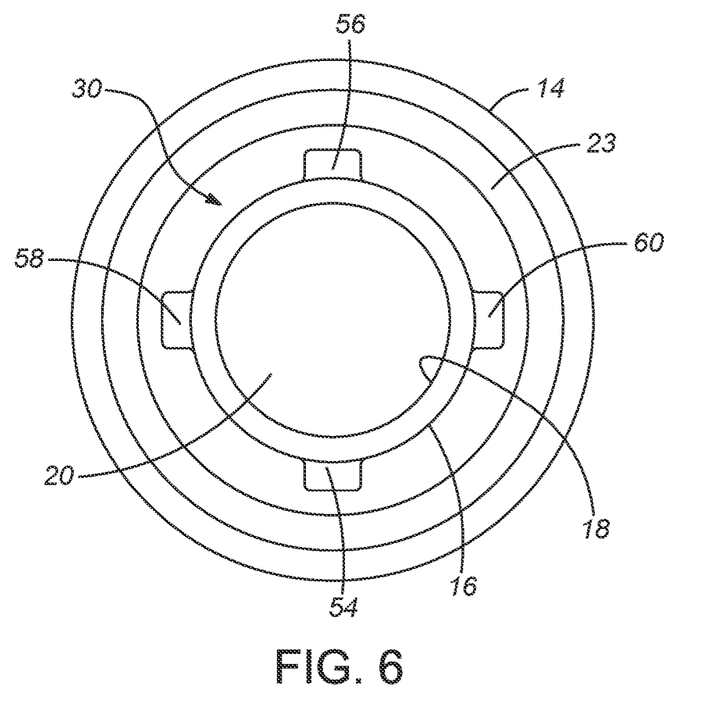
FIG. 6 illustrates a bottom view of a second embodiment of the male connector body having four locking members according to this disclosure.
Figure 7:
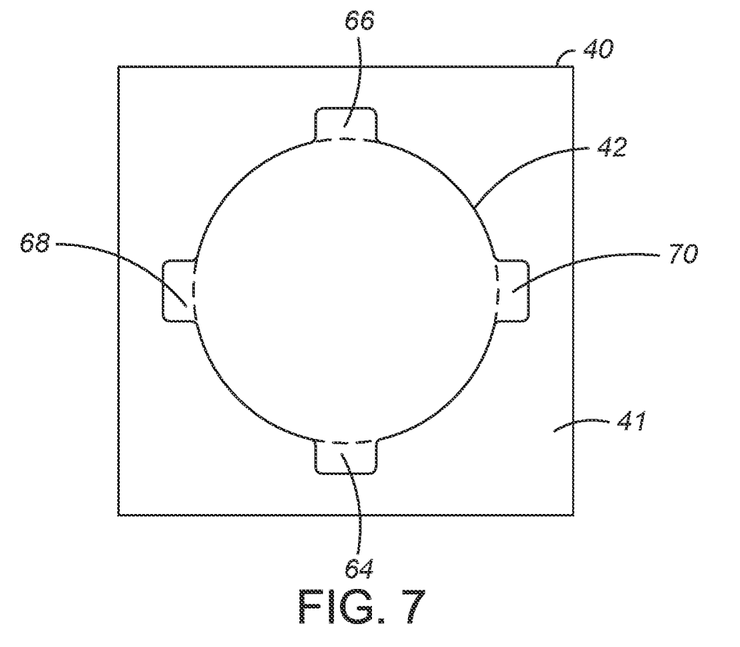
FIG. 7 illustrates a top plan view of the vessel wall configured to use the male connector body of FIG. 6 according to this disclosure.

In a second embodiment illustrated by FIG. 6 the lower portion of body 12 can be arranged to contain four locking member 54, 56, 58, 60 extending from exterior surface 16 spaced equidistantly along the circumference of the lower portion 30. Similarly, the aperture 42 formed on wall 40 of the vessel would include four recesses 64, 66, 68, 70 spaces equidistantly along the edge of aperture 42 that align with locking members 54, 56, 58, 60 respectively. Each of the recesses 64, 66, 68 and 70 are formed with a length in a circumferential direction, which corresponds to the circumferential length of a respective locking member 54, 56, 58, 60. A respective locking member 54, 56, 58, 60 is arranged to be installed within a respective recess 64, 66, 68, 70 to cause the sealing member 14 to seal against surface 41 of wall 40 when the body 12 is rotated clockwise as was explained above.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fluid coupling for connecting a vessel to a fluid tube, the fluid coupling comprising:
    a cylindrical body having a cylindrical outer surface and defining a longitudinal axis;
    a head portion located at an upper end of the body and a base portion defining a lower end of the body the head portion forming an endform and a frustoconical head, the endform having a groove extending circumferentially about the endform, the endform and the frustoconical head arranged to be received within a receptacle connected to the fluid tube, wherein the groove accepts first and second legs of a locking clip retaining the endform to the receptacle;
    a passage through the body for the passage of a fluid;
    a vessel wall having a top surface and a bottom surface and an aperture extending through the vessel wall;
    at least first and second locking members extending radially from the base portion of the body located in a spaced relation to each other on opposite sides of the base portion each locking member including a ramped surface extending to a plateau surface and the base portion arranged to be installed within the aperture and each locking member accepted within a respective recess formed on an edge of the aperture; and
    a sealing flange extending circumferentially about the base portion above the first and second locking members, whereby rotation of the body within the aperture causes each locking member ramped surface to travel against a peripheral edge of each recess until the plateau surface rests on the vessel wall bottom surface that produces a force in a longitudinal axial direction between the first and second locking members and the vessel wall causing the sealing flange to seal against the vessel wall top surface.

2. The fluid coupling according to claim 1, wherein the first and second locking members each include an end wall extending from the plateau surface for limiting rotation of the body.

3. The fluid coupling according to claim 2, wherein the first and second locking members ramped surfaces travel circumferentially along the aperture until each of the plateau surfaces engages the vessel wall bottom surface and each locking member end wall engages the peripheral edge of its respective recess.

4. The fluid coupling according to claim 1, wherein the sealing flange includes an upper and a lower surface the sealing flange lower surface including an annular channel extending circumferentially about the lower surface, the sealing flange lower surface and channel sealing against the vessel wall top surface.

5. The fluid coupling according to claim 4, wherein the channel is filled with an adhesive paste.

6. The fluid coupling according to claim 1, wherein the body includes a plurality of locking members extending radially from the base portion of the body and the aperture includes a plurality of recesses located about the edge of the aperture, each locking member of the plurality of locking members located in a spaced relation to each other along the lower end of the body and each locking member arranged to be accepted within a respective recesses.

7. A connector assembly for making a fluid connection between a wall and a fluid tube, comprising:
    a male connector having a cylindrical body;
    a head portion located at an upper end of the male connector and a base portion defining a lower end of the male connector, the head portion including an endform and a frustoconical head and the endform having a groove extending circumferentially about the endform;
    a passage through the male connector for passage of a fluid;
    an aperture formed through en a top surface and a bottom surface of the wall and at least first and second recesses formed along an edge of the aperture;
    at least a first and a second locking member located on the base portion of the male connector the locking members located in a spaced relation to the other on opposite sides of the male connector each locking member including a ramped surface extending to a plateau surface and the base portion arranged to be installed within the aperture and each locking member installed within a respective recess;

a sealing flange extending circumferentially about the base portion of the male connector, wherein rotation of the male connector causes the locking members to rotate within the aperture and each ramped surface to travel against a peripheral edge of each recess until the plateau surface rests on the vessel wall bottom surface sealing the sealing flange against the wall top surface; and a female connector connected to the fluid tube installed on the endform and the frustoconical head, wherein the groove accepts first and second legs of a locking clip that retains the endform to the female connector.

8. The connector assembly of claim 7, wherein the first and the second locking members each include an end wall extending from the plateau surface for limiting rotation of the male connector.

9. The connector assembly of claim 8, wherein the first and second locking members ramped surfaces travel circumferentially along the aperture until each of the plateau surfaces engages the vessel wall bottom surface and each locking member end wall engages an edge of its respective recess and produce a force in the longitudinal axial direction causing the sealing flange to seal against the vessel top surface.

10. The connector assembly of claim 7, wherein the sealing flange includes an upper and lower surface the sealing flange lower surface including an annular channel extending circumferentially about the lower surface, the sealing flange lower surface and channel sealing against the wall top surface.

11. The connector assembly of claim 10, wherein the channel is filled with an adhesive paste.

12. The connector assembly of claim 7, wherein the male connector includes a plurality of locking members extending radially from the base portion of the male connector and the aperture includes a plurality of recesses located about the edge of the aperture, each locking member of the plurality of locking members located in a spaced relation to each other along the lower end of the body and each locking member arranged to be accepted within a respective recesses.

13. A method for connecting a fluid connector between a wall and a fluid tube, the method comprising:

forming an aperture through the wall between a top surface and a bottom surface, the aperture including at least first and second recesses formed along an edge of the aperture;

providing a male connector having a passage for fluid through the male connector between a head portion located at an upper end of the male connector and a base portion on a lower end of male connector, the head portion including an endform and a frustoconical head the endform having a groove extending circumferentially about the endform and the base portion including a sealing flange extending circumferentially about the base portion and at least first and second locking members extending outward from the base portion and each locking member including a ramped surface extending to a plateau surface;

installing the base portion in the aperture and the first and second locking members within respective first and second recesses and rotating the male connector within the aperture causing each ramped surface to travel against a peripheral edge of each recess until the plateau surface rests on the vessel wall bottom surface and the sealing flange to seat against the wall top surface;

installing a female connector connected to the fluid tube on the endform and frustoconical head; and installing first and second legs of a locking clip in the groove to retain the endform to the female connector.

14. The method of claim 13, wherein the sealing flange includes an upper and lower surface the sealing flange lower surface including an annular channel extending circumferentially about the lower surface, the method further including:

sealing the flange lower surface and channel against the wall top surface.

15. The method of claim 14, wherein the method further includes:

filling the channel with an adhesive paste before sealing the flange lower surface against the wall top surface.

* * * * *